(12) United States Patent
Hastings

(10) Patent No.: US 7,363,999 B2
(45) Date of Patent: Apr. 29, 2008

(54) POSITIVE AIR FLOW DRIVE TRAIN UNIT FOR UTILITY VEHICLE

(75) Inventor: Dawson W. Hastings, Selma, AL (US)

(73) Assignee: Bush Hog, LLC, Selma, AL (US)

( * ) Notice: Subject to any disclaimer, the term of this patent is extended or adjusted under 35 U.S.C. 154(b) by 407 days.

(21) Appl. No.: 10/529,107

(22) PCT Filed: Feb. 9, 2005

(86) PCT No.: PCT/US2005/004334

§ 371 (c)(1),
(2), (4) Date: Mar. 24, 2005

(87) PCT Pub. No.: WO2005/077089

PCT Pub. Date: Aug. 25, 2005

(65) Prior Publication Data

US 2006/0090942 A1    May 4, 2006

Related U.S. Application Data

(60) Provisional application No. 60/543,161, filed on Feb. 10, 2004.

(51) Int. Cl.
*B62K 11/00*    (2006.01)

(52) U.S. Cl. .................. 180/220; 180/292; 180/68.1; 180/68.4; 180/908; 180/68.2; 180/68.3

(58) Field of Classification Search .............. 180/292, 180/68.1, 68.4, 908, 68.2, 68.3
See application file for complete search history.

(56) References Cited

U.S. PATENT DOCUMENTS 438,644 A    10/1890    Robertson (Continued)

FOREIGN PATENT DOCUMENTS

JP    59164226 A    9/1984

(Continued)

OTHER PUBLICATIONS

International Search Report and Written Opinion in PCT/US05/04334, dated Oct. 4, 2007.

*Primary Examiner*—Christopher P. Ellis
*Assistant Examiner*—Cynthia F. Collado
(74) *Attorney, Agent, or Firm*—Cook, Alex, McFarron, Manzo, Cummings & Mehler, Ltd.

(57) ABSTRACT

A utility vehicle is provided which has a CVT drive unit. A housing for the drive unit provides an enclosure for the CVT drive components and defines an air flow path. An inlet port associated with the CVT housing includes a fan assembly which provides a source for filtered ambient air flow into the CVT housing. An outlet port associated with the CVT housing provides an exit for the air flow path and equalizes pressure within the enclosure. The interior of the housing is pressurized with ambient air in order to cool the CVT components therein. The pressurized air also creates an air curtain which prevents moisture and debris from intruding into the housing. Preferably the fan is powered separately from the engine of the utility vehicle to ensure positive air flow into the CVT housing even when the engine is in idle mode.

19 Claims, 6 Drawing Sheets

U.S. PATENT DOCUMENTS

| | | | |
|---|---|---|---|
| 1,512,546 | A | 10/1924 | Kimble |
| 2,145,545 | A | 1/1939 | Johnson et al. |
| 2,842,974 | A | 7/1958 | Neumann |
| 2,955,748 | A | 10/1960 | Killian |
| 3,467,177 | A | 9/1969 | Hoddinott |
| 3,789,684 | A | 2/1974 | Freier, Jr. |
| 3,943,785 | A | 3/1976 | Percifield |
| 4,187,732 | A | 2/1980 | Takagi et al. |
| 4,422,498 | A | 12/1983 | Chen |
| 4,493,677 | A | 1/1985 | Ikenoya |
| 4,497,285 | A | 2/1985 | Kondo |
| 4,531,928 | A | 7/1985 | Ikenoya |
| 4,596,537 | A | 6/1986 | Te-Long |
| 4,631,977 | A | 12/1986 | Kawashima |
| 4,632,070 | A | 12/1986 | Onda et al. |
| 4,671,781 | A | 6/1987 | Tanaka et al. |
| 4,671,782 | A | 6/1987 | Ochiai et al. |
| 4,697,665 | A | 10/1987 | Eastman et al. |
| 4,712,629 | A | 12/1987 | Takahashi et al. |
| 4,733,639 | A | 3/1988 | Kohyama et al. |
| 4,901,813 | A * | 2/1990 | Kimura et al. ............... 180/230 |
| 5,086,858 | A | 2/1992 | Mizuta et al. |
| 5,101,924 | A * | 4/1992 | Yamagiwa et al. ......... 180/220 |
| 5,152,361 | A | 10/1992 | Hasegawa et al. |
| 5,183,130 | A | 2/1993 | Nakamura et al. |
| 5,725,446 | A | 3/1998 | Kaku et al. |
| 5,976,044 | A | 11/1999 | Kuyama |
| 6,176,796 | B1 | 1/2001 | Lislegard |
| 6,267,700 | B1 | 7/2001 | Takayama |
| 6,394,555 | B2 | 5/2002 | Mizuta et al. |
| 6,422,332 | B1 | 7/2002 | Takata et al. |
| 6,460,916 | B2 | 10/2002 | Mizuta |
| 6,517,111 | B2 | 2/2003 | Mizuta |
| 6,523,879 | B2 | 2/2003 | Mizuta |
| 6,601,668 | B2 | 8/2003 | Kitai et al. |
| 6,616,207 | B2 | 9/2003 | Mizuta |
| 6,622,806 | B1 | 9/2003 | Matsuura |
| 6,633,800 | B1 * | 10/2003 | Ward et al. .................... 701/2 |
| 6,666,290 | B2 | 12/2003 | Yamauchi |
| 6,675,922 | B2 | 1/2004 | Kawamoto et al. |
| 6,694,836 | B2 | 2/2004 | Kawamoto et al. |
| 6,695,083 | B2 | 2/2004 | Nakamura et al. |
| 6,705,417 | B2 * | 3/2004 | Kitai et al. ................ 180/68.1 |
| 6,733,406 | B2 | 5/2004 | Kitai et al. |
| 6,920,949 | B2 * | 7/2005 | Matsuura et al. ......... 180/68.2 |
| 2001/0024046 | A1 | 9/2001 | Mitzuta |
| 2001/0054832 | A1 | 12/2001 | Mitzuta |
| 2003/0217884 | A1 | 11/2003 | Kawamoto |

FOREIGN PATENT DOCUMENTS

| | | | |
|---|---|---|---|
| JP | | 05026328 A | 2/1993 |
| JP | | 06042612 A | 2/1994 |
| JP | | 06229459 A | 8/1994 |
| JP | | 06272750 A | 9/1994 |

* cited by examiner

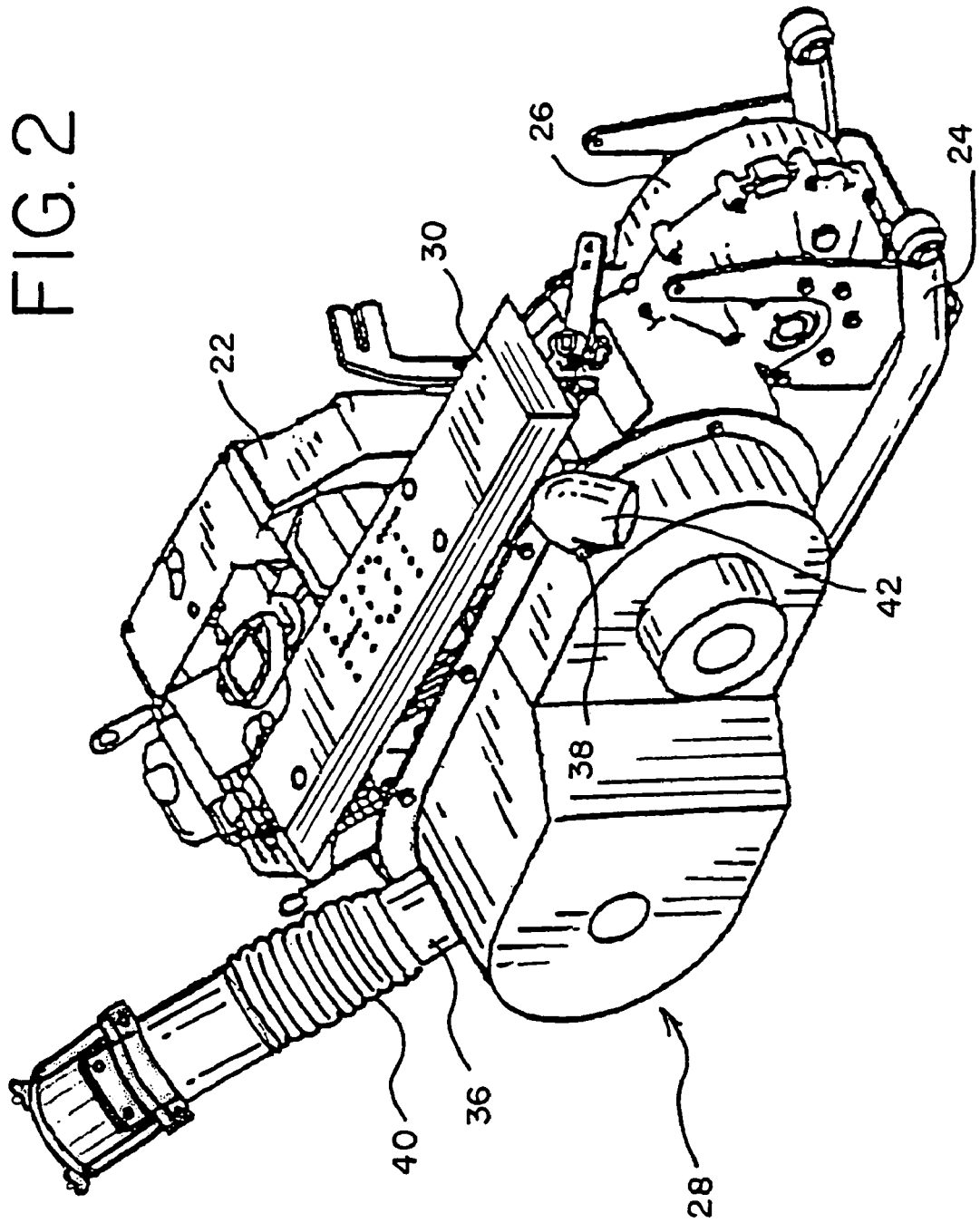

POSITIVE AIR FLOW DRIVE TRAIN UNIT FOR UTILITY VEHICLE

CROSS REFERENCE TO RELATED APPLICATION

Provisional Patent Application Ser. No. 60/543,161, filed Feb. 10, 2004.

BACKGROUND OF THE INVENTION

1. Field of the Invention

This invention generally relates to a drive train system for utility vehicles. A positive pressure approach is used in maintaining air flow through a drive train enclosure. Special application is found for this approach in continuously variable transmissions suitable for use on utility vehicles. The positive pressure achieved by this invention prevents dust and water from entering the transmission enclosure at virtually all times during operation of the vehicle. More particularly, the invention relates to a positive air flow system that operates independently of transmission rotation or operation.

2. Description of Related Art

Utility vehicles of the type which are suitable for all-terrain usage and the like are provided. Utility vehicles are generally four-wheeled vehicles, which are oftentimes operated in harsh conditions with deep water, thick mud, or the like and the problem of maintaining the drive system in working order has been addressed in the past. Examples include utility vehicles illustrated in Mizuta U.S. Pat. Nos. 5,086,858, 6,394,555, 6,460,916, 6,517,111, 6,523,879 and 6,616,207, each being incorporated by reference hereinto. The '858 Mizuta patent particularly shows an air intake system for a utility vehicle. A belt converter drive system is shown with a cooling assembly. The cooling assembly has an air intake which is located on the upper part of the frame of the vehicle. Cooling fan blades revolve with the engine for cooling the belt converter in that arrangement.

Lislegard U.S. Pat. No. 6,176,796, incorporated by reference hereinto, shows a continuously variable transmission with a clutch having enhanced air cooling. This relates to cooling of a continuously variable transmission (known as a CVT). By this patent, air cooling channels are located in the outer surface of one or more of the sheaves on the clutches. The structure and operation of CVT units are found, for example, in U.S. Pat. No. 3,861,229, incorporated by reference hereinto. In the '796 patent, the fins are radially oriented and extend axially from the outer face of the sheave body. In operation, air flow is generated by the fins only when the fins are in rotation when the sheave on which they are positioned is in rotation. Thus, operation of the fins is not independent of operation of the CVT. Air flow is imparted only when the CVT is in operation, but that has been found to be insufficient because the CVT is subject to intrusion by dirt, rainwater, and the like even when the vehicle is in idle mode.

Heretofore, fins and fan arrangements associated with drive trains of utility vehicles have been provided in an effort to cool drive train components. The present invention improves substantially upon this general approach by providing a CVT assembly which has an enclosure having a positive air flow pressure which is not directly driven by a drive train component and which preferably flows longitudinally through the enclosure. An independently-powered cooling/pressurization module for a traction drive housing was proposed in U.S. Pat. No. 4,878,467 (Schmidt). This proposed design is problematic. For example, the blower fan which is proposed introduces coolant into the housing at a direction perpendicular to the rotational plane of the drive components. As a result, the coolant flow path is relatively constrained, so pressurization and cooling are diminished at areas offset from the coolant inlet. Furthermore, adequate cooling of the drive components is not assured, and the pressure along the seams of the housing can be insufficient to reliably prevent the intrusion of moisture and outside particulates.

Accordingly, a general object and aspect of the present invention is to provide an improved drive train unit for a utility vehicle.

Another object or aspect of this invention is to provide an improved drive train unit with an integral module which simultaneously performs a cooling and cleaning function.

Another object or aspect of this invention is to provide an improved drive train unit that uses positive air flow into a CVT enclosure in order to effectively address risks of having dirt, dust or moisture enter the enclosure and potentially foul the CVT and its operation.

Another object or aspect of the present invention is to provide a means for pressurizing a CVT enclosure or housing even while the utility vehicle is in its idle mode.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, a positive air flow drive train unit for a utility vehicle not only cools CVT components but also provides an enclosure or housing having a positive air flow in order to thereby maintain clean conditions within the enclosure, even during the idle mode of the utility vehicle engine. A CVT primary clutch, CVT secondary clutch, and a CVT belt are disposed within the interior of the housing. Preferably, the CVT housing is defined by a cover weldment, a base plate weldment, and a peripheral wall. The peripheral wall includes an inlet port for receiving positive air flow into the housing and an outlet port for the exhaust of air from within the housing. An intake fan associated with the inlet port continuously impels filtered ambient air into the housing, which creates a region of relatively high air pressure therein. The outlet port allows for pressure equalization within the housing and also vents hot air from within the CVT housing. In a preferred embodiment, the inlet and outlet ports are spaced sufficiently far apart such that the air impelled into the housing must cross all of the CVT components disposed therein before exiting through the outlet port and provides positive air pressure throughout the CVT housing.

BRIEF DESCRIPTION OF THE DRAWINGS

FIG. 2 is an perspective view of a preferred engine and drive train assembly isolated from the remainder of the associated utility vehicle;

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention and virtually any appropriate manner.

Figure 1:
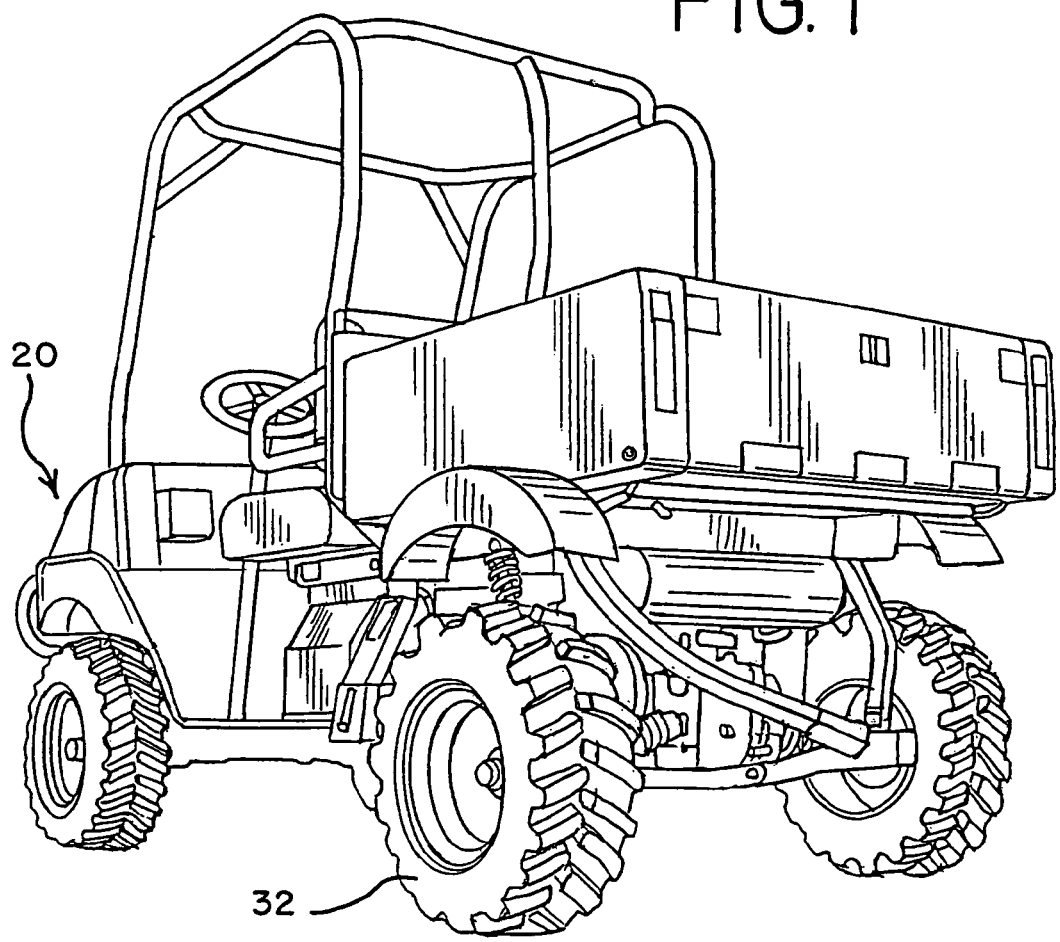
FIG. 1 is a rear perspective view of a rear-engine utility vehicle suitable for use with the present invention.
Figure 3:
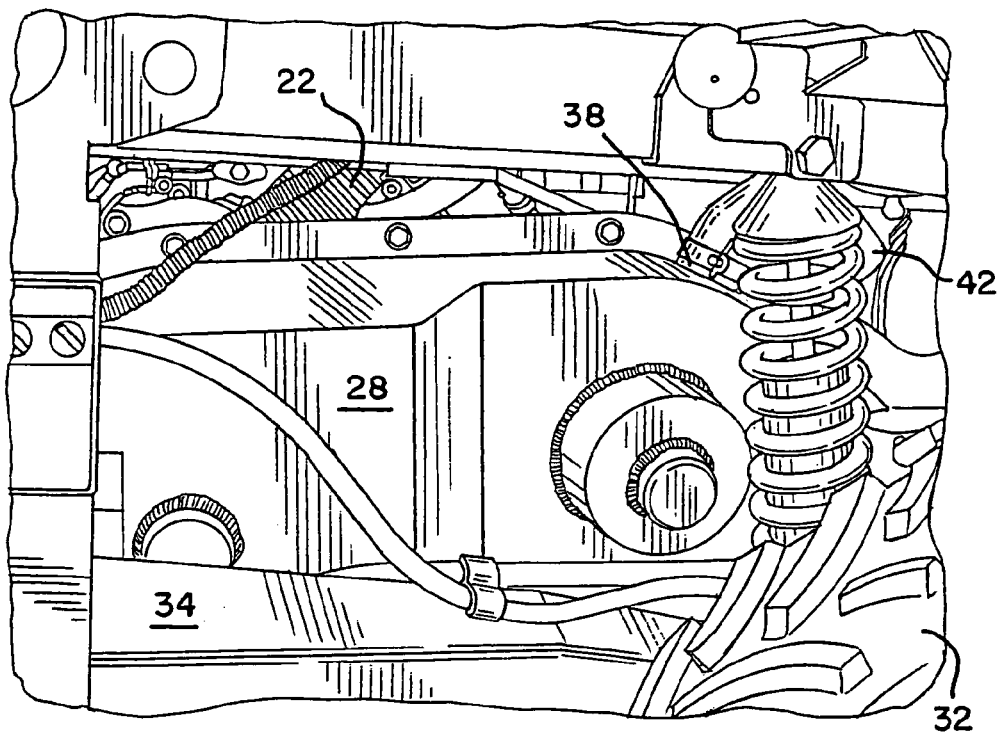
FIG. 3 is a front perspective view of the unit of FIG. 2, with the enclosure housing being mounted in place within a rear portion of the utility vehicle of FIG. 1.

FIG. 1 shows a typical rear-engine utility vehicle 20 which is suitable for use with a CVT unit according to the present invention. The preferred embodiment that is illustrated in FIGS. 2 and 3 includes an engine 22 which is of a type and size suitable for use within a utility vehicle 20. The engine 22 is disposed on top of an engine mount subassembly 24, which also carries a two speed transaxle 26. Disposed adjacent to the engine 22 is the CVT housing, generally designated at 28, as well as a heat shield 30. Also shown in FIG. 3 are a tire 32 and a portion of the trailing arm 34 of the utility vehicle 20. FIGS. 2 and 3 show the CVT housing 28 in place such that the CVT unit is fully surrounded. An inlet port 36 and an outlet port 38 are provided on the housing 28. A conduit 40 associated with the inlet port 36 provides an inlet into the enclosure 28 in order to provide a source of ambient air into the enclosure or housing 28. An outlet conduit 42 associated with the outlet port 38 provides an air exit pathway from the enclosure or housing 28.

Figure 4:
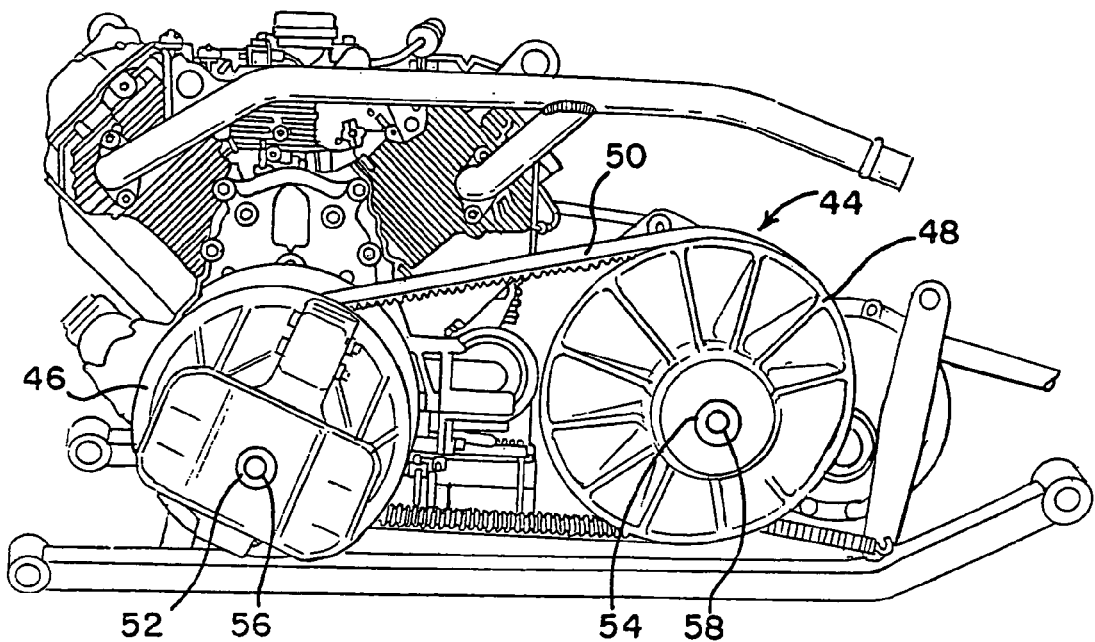
FIG. 4 is a front perspective view of the unit of FIG. 3 shown with the enclosure or housing for the CVT unit being removed.

FIG. 4 illustrates the location of the components of the CVT unit 44 of FIGS. 2 and 3, with the CVT housing 28 omitted for clarity. As shown in FIG. 4, the drive system includes a CVT primary clutch 46, secondary clutch 48, and belt 50 (collectively the CVT components or CVT unit 44), and housing 28 shields same from the environment in which the utility vehicle 20 is operated. A primary clutch bushing 52 and a secondary clutch bushing 54 are also visible in this view. The bushings 52 and 54 act as sleeves to separate the primary and secondary clutches 46 and 48 from the shafts 56 and 58, respectively, upon which they rotate. The CVT components 44 contained within the CVT housing 28 are standard parts and, accordingly, their function and operation are well-known to those skilled in the art.

Figure 5:
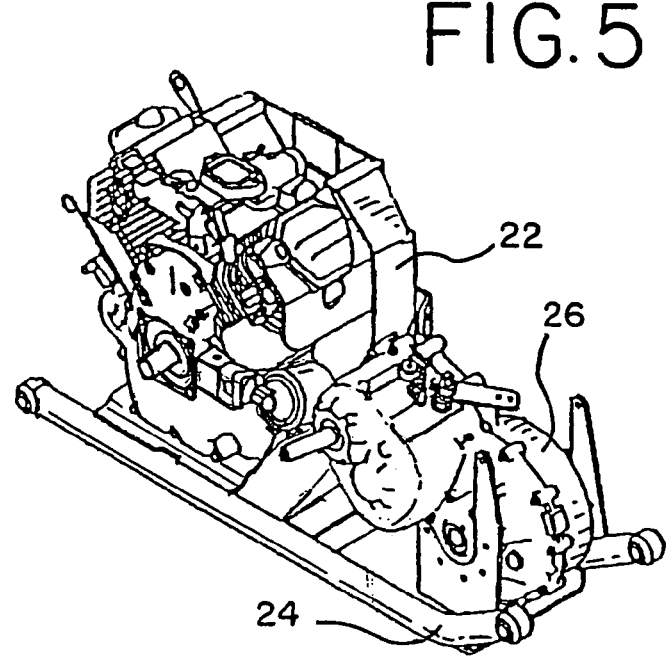
FIG. 5 is a perspective view of the engine and mount arrangement similar to FIG. 2, but from which drive mechanism components are removed.

FIG. 5 illustrates the drive system with the CVT components 44 omitted in order to better show the engine 22 and transaxle 26.

Figure 6:
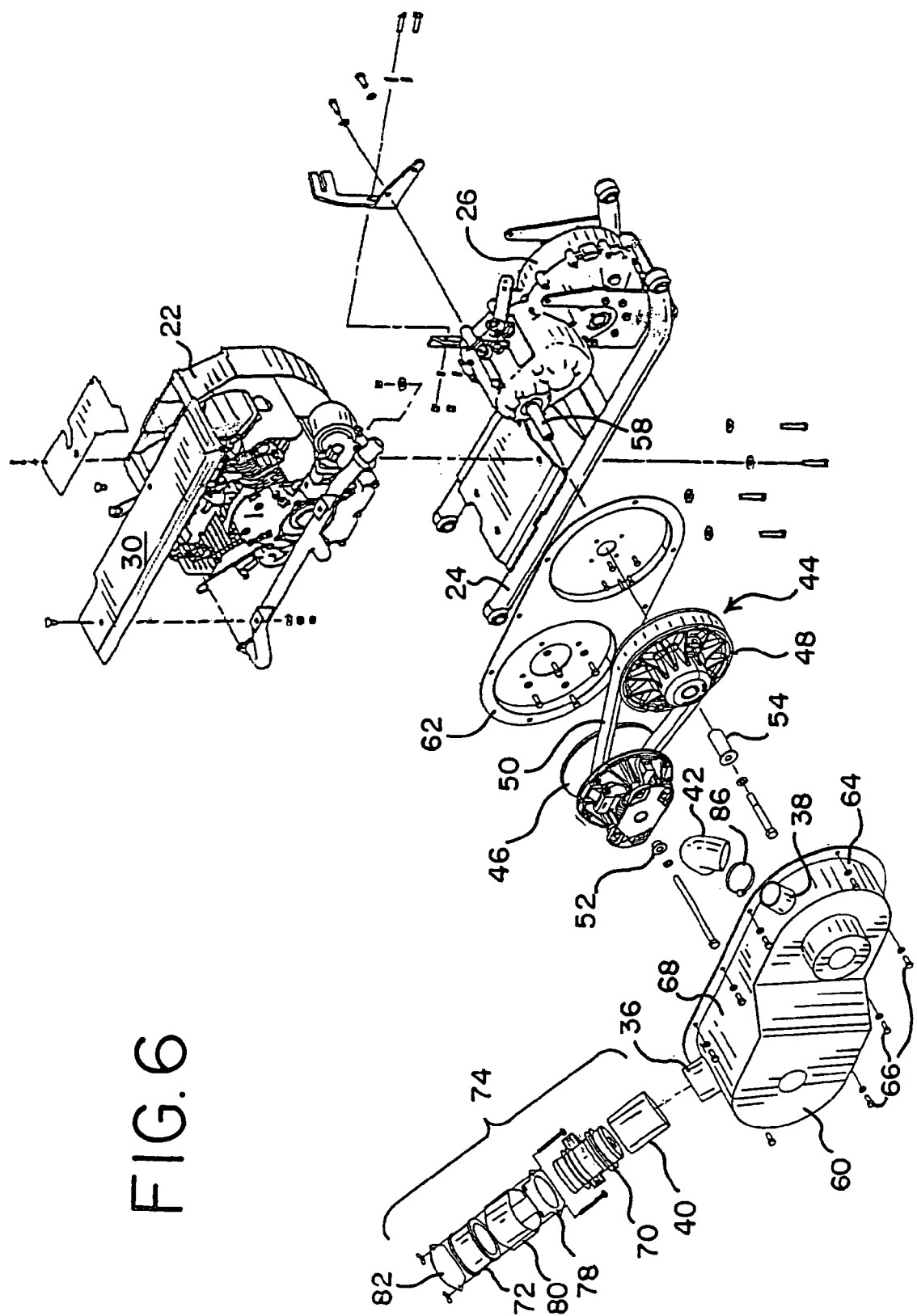
FIG. 6 is an exploded perspective view of the assembly of FIG. 1.

Protection of the CVT unit 44 is provided according to the invention by a full enclosure pressurized housing 28 having a filtered air intake 36. FIG. 6 is an exploded view of the preferred embodiment. In this embodiment, the inlet and outlet ports 36 and 38 are shown in direct communication with the CVT housing 28. Preferably, the inlet and outlet ports 36 and 38 are integrally molded into an outer surface of the CVT housing 28. As shown in FIG. 6, the CVT housing 28 preferably includes a cover weldment 60, a base plate weldment 62, and a peripheral wall 64. Base plate weldment 62 provides sealing and support for the cover weldment 60. The peripheral wall 64 may be a separate component or integral to the cover or base plate weldments 60 and 62. The various components of the CVT housing 28 may be interconnected in any suitable manner, though FIG. 6 illustrates the use of HHCS components 66 to secure the enclosure 28.

Figure 7:
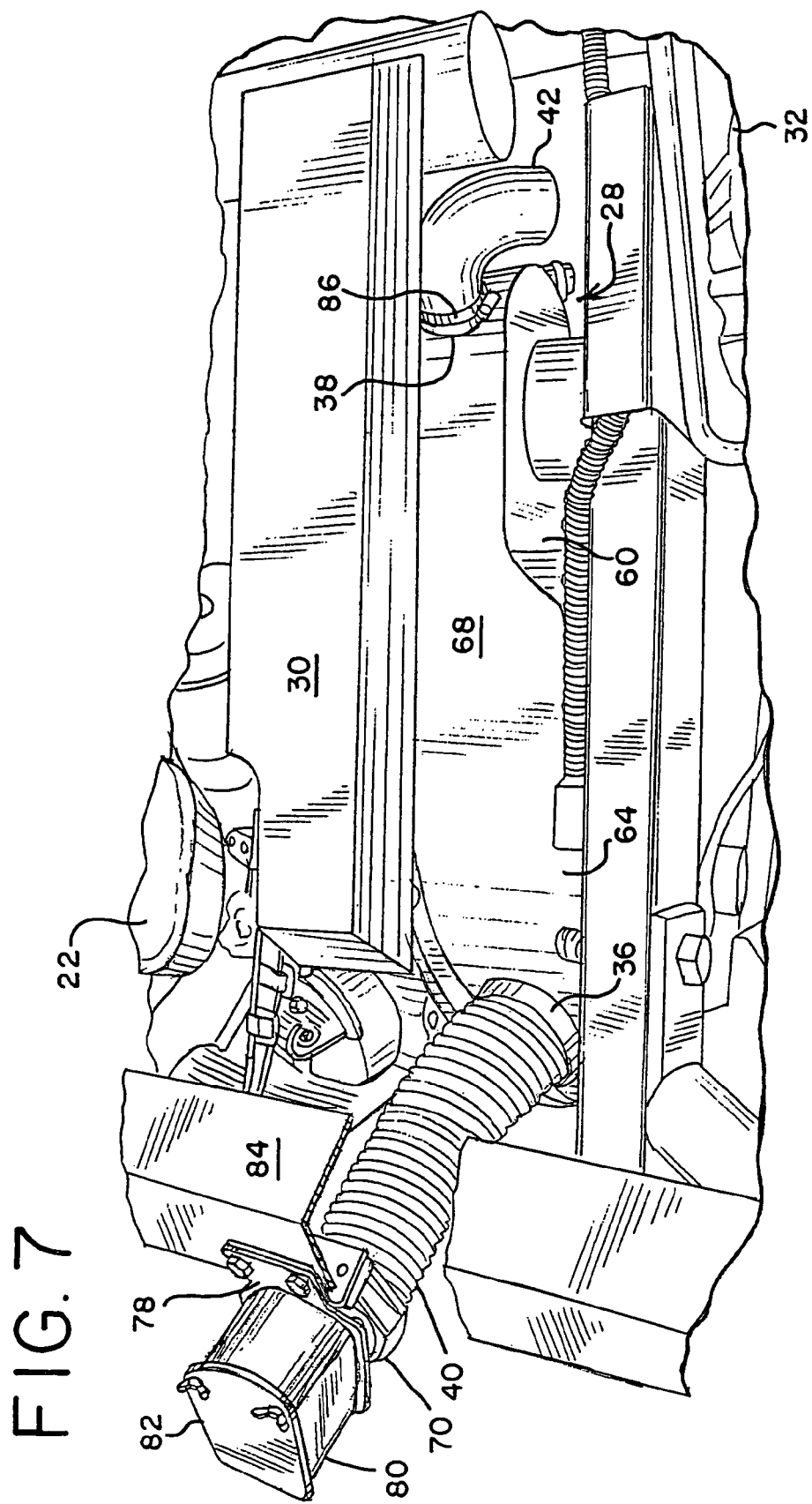
FIG. 7 is a top perspective view of the unit of FIG. 2, mounted in place within the utility vehicle and with a portion of a frame member removed to better show the intake assembly.

Preferably, the inlet port 36 and outlet port 38 are sufficiently spaced from one another such that the air flowing through the CVT housing 28 must pass over all of the CVT components 44. In the preferred illustrated embodiment, the air flow is generally longitudinally through the housing 28 to help ensure that positive pressurization is maintained throughout the housing volume. Additionally, as illustrated in FIG. 7, the ports 36 and 38 may be disposed at different positions along an upper surface 68 of the peripheral wall 64 of the CVT housing 28 in order to enhance air flow, pressurization, cleaning, and cooling. In the preferred embodiment of FIGS. 6 and 7, the inlet port 36 is located upstream of the outlet port 38, which allows hot air to be vented from the CVT housing 28 at a rear portion of the utility vehicle 20.

Figure 8:
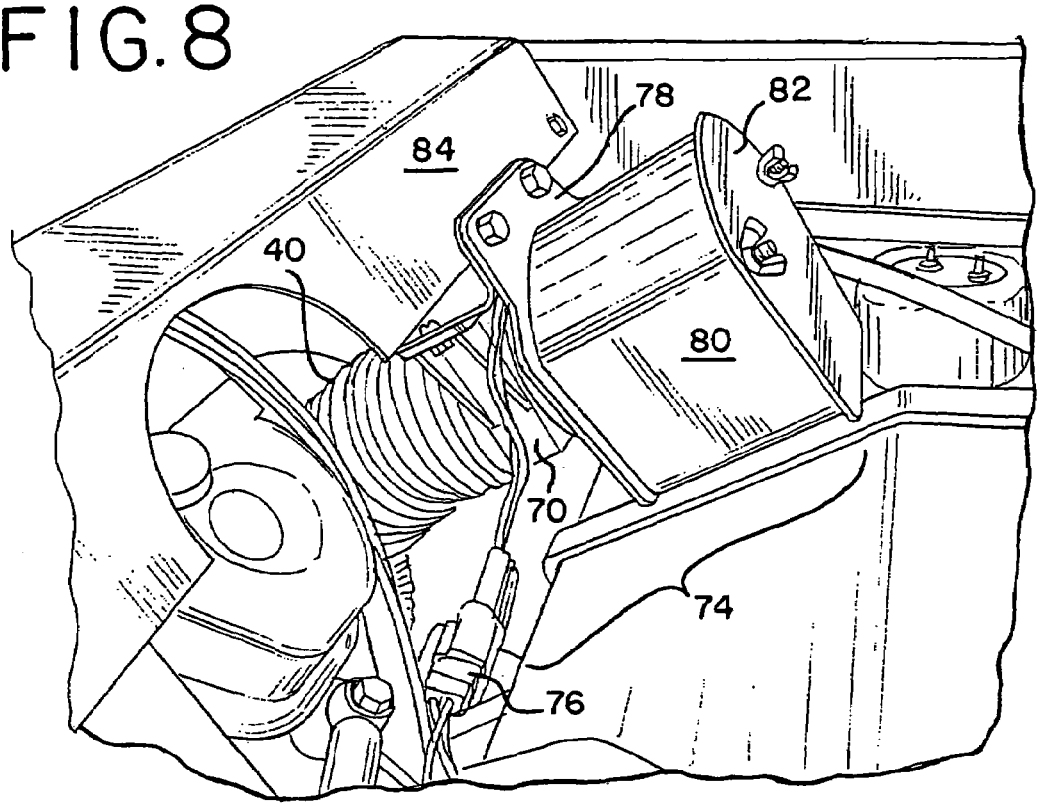
FIG. 8 is a detailed view from an angle different from that of FIG. 7 and showing the intake fan unit and associated filter in greater detail.

A fan 70 and filter 72 are preferably associated with the inlet port 36. FIG. 6 shows the inlet port 36 connected to an electric fan 70 through a conduit 40 in the form of a connecting hose. Preferably the conduit 40 is removably affixed to the inlet port 36 by a friction fit, although separate attachment means may be used. FIG. 8 shows the assembled inlet assembly 74 from a different angle. Mounted at an upstream end of the inlet assembly 74 is a filter 72 which is intended to prevent unwanted particulate material from entering the intake conduit 40. Positioned between the inlet conduit 40 and the filter 72 is an intake fan unit 70. Also shown is a power line 76 by virtue of which power is supplied to the intake fan 70 so that same may be run independently of the operation of the CVT unit 44.

Other components of the inlet assembly 74 preferably include a fan-mounting frame 78, a filter cover 80, and an end plate 82. As shown in FIGS. 7 and 8, the fan-mounting frame 78 is bolted to a frame member 84 of the utility vehicle 20. An air exhaust conduit 42 is associated with the outlet port 38 for directing the air exiting from the interior of the CVT enclosure 28. For example, FIGS. 6 and 7 illustrate an air exhaust conduit 42 in the form of an elbow, which directs the exiting air away from the interior of the utility vehicle 20. Preferably, the air exhaust conduit 42 is removably affixed to the outlet port 38, with extra security being provided by an annular clamp or strap 86.

Figure 9:
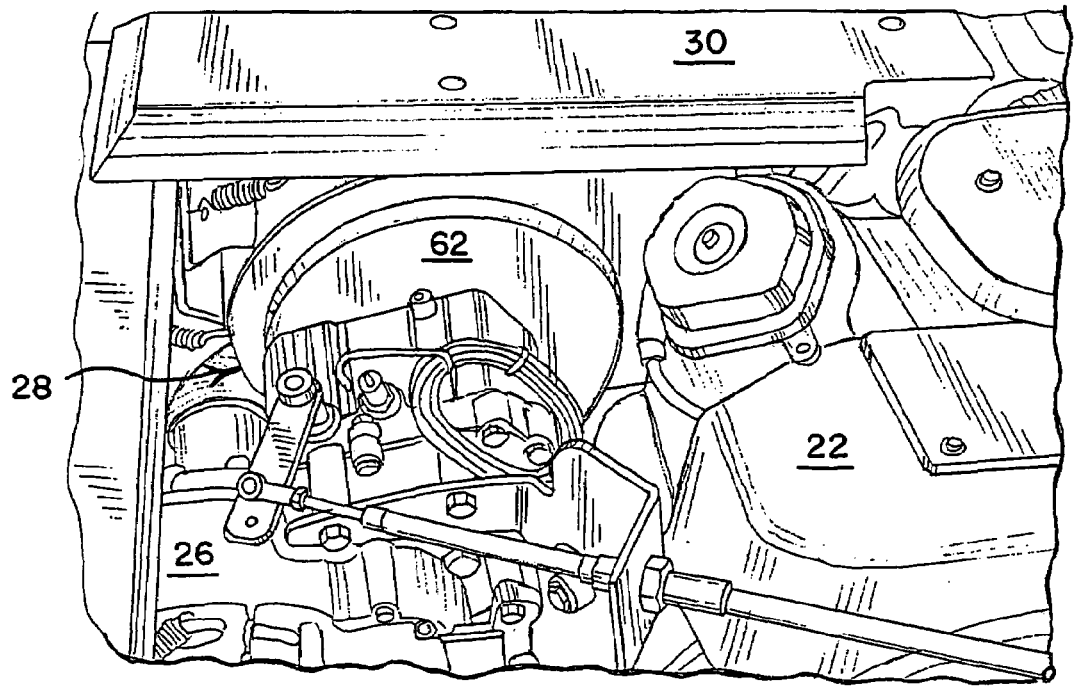
FIG. 9 is a rear perspective view of the CVT enclosure.

FIG. 9 provides a back side view of the CVT enclosure 28. This back view shows the rear of the enclosure 28. More particularly, a base plate weldment 62 provides a substantial portion of the enclosure 28. When the interface between the base plate 62 and the rest of the enclosure 28 is bolted in place, it can be possible for positive air pressure developed within the enclosure or housing 28 to escape at the interface at a very low volume rate. This effectively creates an air curtain which ensures that moisture, dust and dirt will not enter through a seam between these housing components 60, 62, and 64. Alternatively, a sealing gasket or a pliable sealant can be positioned at this interface between the housing components 60, 62, and 64 in order to minimize the risk of intrusion into the enclosure housing 28 of moisture, dust and dirt.

Because of the provision of the positive pressure, any voids provided in the housing 28 will not be breached by inflow of moisture and outside particulates while the fan unit 70 imparts positive air flow into and through the housing or enclosure 28, exiting through the outlet conduit 42 and any housing gaps, seams, or imperfections which would otherwise allow undesired inflow. Inasmuch as the fan unit 70 is powered independently of operation of the CVT unit 44, the positive pressure is provided even while the utility vehicle 20 is resting at idle. In the preferred embodiment, the power is provided to the fan unit 70 in conjunction with an oil pressure detection or monitoring unit associated with the engine 22. Thus, when oil pressure is generated because the engine 22 is running, the fan unit 70 will be in operation.

Alternatively, the fan unit 70 can be operated off of the ignition system of the utility vehicle 20. This has a possible disadvantage of having the fan unit 70 run even when the engine 22 is not in operation, which is not a time when there would be a substantial concern of dust, dirt or moisture entering the CVT housing 28.

With the present invention, the independently operated fan unit 70 creates a positive pressure. This positive pressure is provided at any RPM of the engine 22, even under idle conditions. The fan unit 70 can be one of a type that is suitable for use in a bilge pump for a boat.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A utility vehicle comprising:
   a frame supporting at least three ground-engaging wheels;
   an engine supported by virtue of the frame;
   a drive assembly for one or more of the ground-engaging wheels;
   a continuously variable transmission unit in operative engagement with the engine and supported by operation of the frame;
   a housing of said continuously variable transmission, said housing including a peripheral wall positioned between opposing members and transmission components therewithin, said housing having an inlet thereinto and an outlet therefrom, wherein both said inlet and said outlet are disposed at positions along said peripheral wall; and
   a fan unit positioned in operative fluid-passing relationship with the inlet to the housing, said fan unit impelling ambient air into the housing so as to impart a positive pressure within the housing and develop an air flow out of said housing through at least the outlet of the housing, thereby minimizing risk of intrusion into the housing of moisture, dust and/or dirt.

2. The utility vehicle of claim 1, said peripheral wall further including an upper portion, wherein at least a selected one of said inlet and said outlet is disposed at a position along the upper portion of said peripheral wall.

3. The utility vehicle of claim 2, wherein both of said inlet and said outlet are disposed at positions along said upper portion of said peripheral wall.

4. The utility vehicle of claim 1, wherein said housing, said inlet, and said outlet define a generally longitudinal enclosed air flow path between said inlet and said outlet.

5. The utility vehicle of claim 4, wherein said inlet and outlet are at generally opposing end portions of the housing.

6. The utility vehicle of claim 1, wherein said inlet and said outlet are positioned so that the fan unit imparts positive pressure throughout substantially the entire housing.

7. The utility vehicle of claim 4, wherein said air flow path crosses all of the transmission components within the housing.

8. The utility vehicle of claim 1, said fan unit further including a filter for preventing ingress of outside particulates.

9. The utility vehicle of claim 1, said fan unit further including a power line, wherein said power line provides power to said fan unit, said power line operating independently of said transmission components.

10. The utility vehicle of claim 9, further including an oil pressure monitoring unit, wherein the power line is operatively coupled to said oil pressure monitoring unit.

11. The utility vehicle of claim 1, said outlet further including an air exhaust hose associated with said outlet for directing air away from said housing enclosure.

12. A utility vehicle comprising:
    a frame supporting at least three ground-engaging wheels;
    an engine supported by virtue of the frame;
    a drive assembly for one or more of the groundengaging wheels;
    a continuously variable transmission unit in operative engagement with the engine and supported by operation of the frame;
    a housing of said continuously variable transmission, said housing including transmission components therewithin, said housing having an upstream portion, a downstream portion, an inlet thereinto disposed at the upstream portion of said housing, and an outlet therefrom disposed at the downstream portion of said housing; and
    a fan unit positioned in operative fluid-passing relationship with the inlet to the housing, said fan unit impelling ambient air into the housing so as to impart a positive pressure within the housing and develop an air flow in a generally longitudinal direction from said upstream portion to said downstream portion and out of said housing through at least the outlet of the housing, thereby minimizing risk of intrusion into the housing of moisture, dust and/or dirt.

13. The utility vehicle of claim 12, wherein said inlet and said outlet are positioned so that the fan unit imparts positive pressure throughout substantially the entire housing.

14. The utility vehicle of claim 12, wherein said housing, said inlet, and said outlet define a generally longitudinal enclosed air flow path between said inlet and said outlet.

15. The utility vehicle of claim 14, wherein said air flow path crosses all of the transmission components within the housing.

16. The utility vehicle of claim 12, said fan unit further including a power line, wherein said power line provides power to said fan unit, said power line operating independently of said transmission components.

17. A method of creating positive air pressure within a continuously variable transmission housing containing a belt which is rotatable in a plane, comprising:
    providing an inlet and an outlet associated with said housing;
    impelling air into said housing through the inlet in a direction disposed at an acute angle with respect to said plane, thereby imparting positive pressure throughout substantially the entire housing; and
    exhausting air from said housing through the outlet, thereby regulating the positive pressure within the housing.

18. The method of claim 17, wherein the direction is parallel to said plane.

19. The method of claim 18, wherein the inlet is disposed within said plane.

* * * * *